(12) United States Patent
Kudo et al.

(10) Patent No.: US 11,251,647 B2
(45) Date of Patent: Feb. 15, 2022

(54) VEHICLE ELECTRICITY STORAGE DEVICE

(71) Applicant: Panasonic Intellectual Property Management Co., Ltd., Osaka (JP)

(72) Inventors: Takahiro Kudo, Kyoto (JP); Yohsuke Mitani, Osaka (JP); Yoshimitsu Odajima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 16/324,051

(22) PCT Filed: Aug. 30, 2017

(86) PCT No.: PCT/JP2017/031096
§ 371 (c)(1),
(2) Date: Feb. 7, 2019

(87) PCT Pub. No.: WO2018/043538
PCT Pub. Date: Mar. 8, 2018

(65) Prior Publication Data
US 2019/0173311 A1   Jun. 6, 2019

(30) Foreign Application Priority Data

Aug. 31, 2016 (JP) .............................. JP2016-168756

(51) Int. Cl.
*H02J 7/14* (2006.01)
*B60R 16/033* (2006.01)
(Continued)

(52) U.S. Cl.
CPC .......... *H02J 7/1446* (2013.01); *B60R 16/033* (2013.01); *F02N 11/0866* (2013.01);
(Continued)

(58) Field of Classification Search
CPC ...... H02J 7/1446; H02J 2207/20; H02J 7/345; H02J 9/061; H02J 9/068; H02J 2310/46;
(Continued)

(56) References Cited

U.S. PATENT DOCUMENTS

| 4,532,594 | A | * | 7/1985 | Hosaka | ................. | F02D 41/266 |
|---|---|---|---|---|---|---|
|  |  |  |  |  |  | 701/114 |
| 7,188,024 | B2 | * | 3/2007 | Yamaguchi | ........... | F02D 41/062 |
|  |  |  |  |  |  | 307/10.6 |

(Continued)

FOREIGN PATENT DOCUMENTS

| JP | 5-074147 U | 10/1993 |
|---|---|---|
| JP | 2002-152915 | 5/2002 |

(Continued)

OTHER PUBLICATIONS

International Search Report of PCT application No. PCT/JP2017/031096 dated Nov. 28, 2017.

*Primary Examiner* — M Baye Diao
(74) *Attorney, Agent, or Firm* — McDermott Will and Emery LLP

(57) ABSTRACT

The present disclosure relates to a vehicle electricity storage device capable of maintaining proper backup of a main power supply. The vehicle electricity storage device includes an electricity storage circuit, a main charge circuit, and a precharge circuit. The electricity storage circuit configured to supply stored electricity to a load. The main charge circuit operates to supply electricity of a main power supply to the electricity storage circuit when an ignition switch is in an ON state of allowing an engine to start. The precharge circuit operates to supply electricity of the main power supply to the electricity storage circuit when the main charge circuit is in a state of stopping operation by the ignition switch being turned off.

12 Claims, 3 Drawing Sheets

(51) Int. Cl.
*F02N 11/08* (2006.01)
*H02J 7/34* (2006.01)
*H02J 9/06* (2006.01)

(52) U.S. Cl.
CPC .............. *H02J 7/345* (2013.01); *H02J 9/061* (2013.01); *H02J 9/068* (2020.01); *H02J 2207/20* (2020.01)

(58) Field of Classification Search
CPC ................ F02N 11/0866; F02N 11/10; F02N 2200/063; F02N 2011/0885; F02N 11/087; B60R 16/033
USPC ......................................................... 320/104
See application file for complete search history.

(56) References Cited

U.S. PATENT DOCUMENTS

| | | | | |
|---|---|---|---|---|
| 7,210,055 B2* | 4/2007 | Honda | .................. | F02D 41/221 713/500 |
| 7,475,234 B2* | 1/2009 | Suzuki | .................... | F02D 41/22 713/1 |
| 9,254,751 B2* | 2/2016 | Yamashita | ................. | B60L 1/00 |
| 10,063,133 B2* | 8/2018 | Shizu | ........................ | F24F 11/89 |
| 10,268,221 B2* | 4/2019 | Satake | ........................ | G05F 1/56 |
| 10,749,217 B2* | 8/2020 | Fukae | ........................ | H02J 7/342 |
| 2009/0229898 A1* | 9/2009 | Fujino | ...................... | B60L 58/10 180/65.29 |
| 2010/0100306 A1* | 4/2010 | Gamache | ............ | F02N 11/0803 701/113 |
| 2012/0074894 A1* | 3/2012 | Chen | ........................ | H02J 7/00 320/103 |
| 2013/0106180 A1* | 5/2013 | Akimasa | ............... | F02N 11/087 307/9.1 |
| 2014/0077771 A1* | 3/2014 | Yamashita | ............... | B60K 6/28 320/167 |

FOREIGN PATENT DOCUMENTS

| | | | |
|---|---|---|---|
| JP | 2010038132 A | * | 2/2010 |
| JP | 2015-012685 | | 1/2015 |
| JP | 2015-116927 | | 6/2015 |

* cited by examiner

VEHICLE ELECTRICITY STORAGE DEVICE

CROSS-REFERENCE TO RELATED APPLICATIONS

This application is a U.S. national stage application of the PCT International Application No. PCT/JP2017/031096 filed on Aug. 30, 2017, which claims the benefit of foreign priority of Japanese patent application 2016-168756 filed on Aug. 31, 2016, the contents all of which are incorporated herein by reference.

TECHNICAL FIELD

The present invention relates to a vehicle electricity storage device that can be an auxiliary power supply for supplying electricity when a voltage of a main power supply reduces.

BACKGROUND

Conventionally, an automobile activates a starter to start an engine. A voltage to the starter is supplied from a battery, which is a main power supply. Since a large current is required to activate the starter, a voltage of the battery is likely to reduce rapidly. Accordingly, an auxiliary power supply device with a capacitor that is used as an electricity storage unit can be used for performing backup of the main power supply. The voltage reduction of the main power supply in activating the starter can be suppressed by discharging from such an auxiliary power supply device.

Unexamined Japanese Patent Publication No. 2015-116927 describes the conventional auxiliary power supply device with a capacitor. In this auxiliary power supply device, when an ignition switch is turned on, a voltage is supplied from a main power supply under the control of charge voltage controller and is charged to an electricity storage unit. Thereafter, supply of the voltage from the main power supply stops when the ignition switch is turned off, and a capacitor voltage in the electricity storage unit gradually reduces.

SUMMARY

In the above auxiliary power supply device, the voltage is not supplied to the electricity storage unit when the ignition switch is in an OFF state. Therefore, when a starter is activated immediately after the ignition switch is turned on, charging of the electricity storage unit tends to be insufficient, and accordingly, proper backup of the main power supply cannot be performed.

In view of the above problem, the present invention provides a vehicle electricity storage device capable of maintaining proper backup of a main power supply.

A main aspect of the present invention relates to a vehicle electricity storage device that is connected to a load mounted on a vehicle together with a main power supply. The vehicle electricity storage device according to the present aspect includes an electricity storage unit, a first charge unit, and a second charge unit. The electricity storage unit is configured to supply stored electricity to the load. The first charge unit operates to supply electricity of the main power supply to the electricity storage unit when an ignition switch is in an ON state of allowing an engine to start. The second charge unit operates to supply the electricity of the main power supply to the electricity storage unit when the first charge unit is in a state of stopping operation by the ignition switch being turned off.

The present invention can provide a vehicle electricity storage device capable of maintaining proper backup of the main power supply.

Effects or meanings of the present invention will be further clarified in the following description of an exemplary embodiment. However, the exemplary embodiment shown below is merely one example of implementing the present invention, and the present invention is not at all limited to the example described in the following exemplary embodiment.

DESCRIPTION OF EMBODIMENT

Hereinafter, an exemplary embodiment of the present invention is described with reference to the accompanying drawings.

In the exemplary embodiment, electricity storage circuit 10 corresponds to an "electricity storage unit" described in the appended claims. Moreover, main charge circuit 20 corresponds to a "first charge unit" described in the appended claims. Further, precharge circuit 30 corresponds to a "second charge unit" described in the appended claims. Still further, cut-off circuit 40 corresponds to a "block unit" described in the appended claims.

However, the above description is only intended to define correspondences between constituents shown in the appended claims and constituents shown in the exemplary embodiment. The correspondences described above should not be construed to limit the scope of the invention described in the appended claims to the configuration described in the exemplary embodiment.

Figure 1:
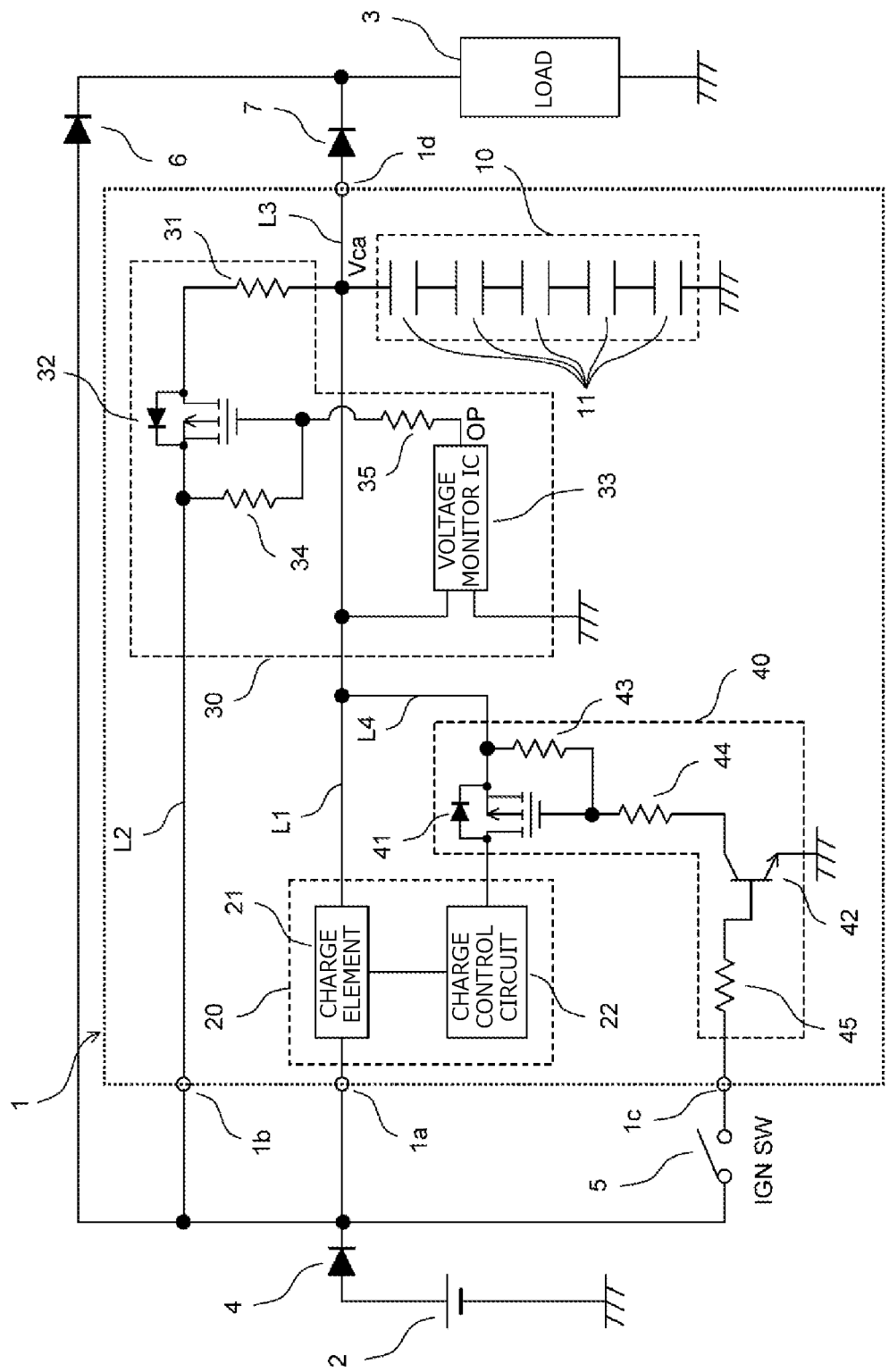
FIG. 1 is a circuit block diagram illustrating a configuration of a vehicle electricity storage device according to an exemplary embodiment.

FIG. 1 is a circuit block diagram illustrating a configuration of vehicle electricity storage device 1 according to an exemplary embodiment.

Vehicle electricity storage device 1 is mounted on an automobile such as a gasoline-fueled vehicle. Vehicle electricity storage device 1 is provided to connect between main power supply 2 and load 3, and functions as an auxiliary power supply for supplying electricity to load 3 when a voltage of main power supply 2 reduces.

Main power supply 2 is constituted of, for example, a battery. An output voltage of main power supply 2 can be, for example, 12 V. Main power supply 2 is connected with first input terminal 1a and second input terminal 1b of vehicle electricity storage device 1 via first diode 4, and meanwhile, is connected with a third input terminal 1c of vehicle electricity storage device 1 via first diode 4 and ignition switch 5. Main power supply 2 supplies electricity to vehicle electricity storage device 1 through first input terminal 1a, second input terminal 1b, and third input terminal 1c. Moreover, main power supply 2 is connected to load 3 via first diode 4 and second diode 6 to supply electricity to load 3. First diode 4 and second diode 6 prevent backflow of current to main power supply 2. Here, main power supply 2 is also connected to an unillustrated starter in order to supply electricity also to the starter.

In the exemplary embodiment, load 3 is an electronic braking system. Load 3 may be an audio or navigation system. Load 3 is connected with output terminal 1d of vehicle electricity storage device 1 via third diode 7. Third diode 7 prevents backflow of current to vehicle electricity storage device 1.

Ignition switch 5 is a switch which operates cooperatively with a movement of an unillustrated ignition key (a key used to start an engine) to be turned on and off. In other words, ignition switch 5 is turned on when the ignition key is turned from a lock position to an electricity supply position. At the electricity supply position, electricity is supplied to vehicle electricity storage device 1. And ignition switch 5 is turned off when the ignition key is returned to the lock position. Further, when the ignition key is turned further beyond the electricity supply position to an engine start position, a starter activates to start the engine.

Vehicle electricity storage device 1 includes an electricity storage circuit 10, main charge circuit 20, precharge circuit 30, and cut-off circuit 40.

Electricity storage circuit 10 includes a plurality of capacitors 11 which are connected in series. It is preferable that capacitors 11 are capable of performing rapid charge and discharge, and as an example of capacitors 11, for example, electric double layer capacitors are used. A full charge voltage of electricity storage circuit 10 can be, for example, 8 V. Electricity storage circuit 10 is connected to first input terminal 1a by first charge line L1. Also, electricity storage circuit 10 is connected to second input terminal 1b by second charge line L2. Further, electricity storage circuit 10 is connected to output terminal 1d by discharge line L3.

Main charge circuit 20 is a circuit which supplies electricity of main power supply 2 to electricity storage circuit 10 through first charge line L1, and includes charge element 21 and charge control circuit 22. Charge element 21 includes a metal-oxide-semiconductor field-effect transistor (MOSFET) and the like, and is provided in first charge line L1. Charge control circuit 22 is connected to charge element 21 and first charge line L1, and turns charge element 21 on and off according to stored electricity voltage Vca of electricity storage circuit 10. Stored electricity voltage Vca is acquired from first charge line L1 through voltage input line L4. In order to allow rapid charging of electricity storage circuit 10, a current flowing from main charge circuit 20 to electricity storage circuit 10 is set to, for example, several amps.

Precharge circuit 30 is a circuit which supplies electricity of main power supply 2 to electricity storage circuit 10 through second charge line L2. And precharge circuit 30 mainly performs supplementary charging to electricity storage circuit 10 when self-discharge of capacitors 11 occurs while ignition switch 5 is in an OFF state and causes the stored electricity voltage Vca of electricity storage circuit 10 to reduce. Precharge circuit 30 includes: first resistor 31 and first MOSFET 32 provided in second charge line L2; and voltage monitor integrated circuit (IC) 33, second resistor 34, and third resistor 35, for causing first MOSFET 32 to perform switching operation.

First resistor 31 is provided for adjusting a current flowing in electricity storage circuit 10 through second charge line L2. A resistance value of first resistor 31 is selected such that the current flowing in electricity storage circuit 10 becomes substantially the same level with a self-discharge current discharged by the self-discharge of capacitors 11. By this, the current flowing from precharge circuit 30 to electricity storage circuit 10 becomes, for example, several tens of micro amps. Hence, a value of the current flowing from precharge circuit 30 to electricity storage circuit 10 is significantly smaller than a value of the current flowing from main charge circuit 20 to electricity storage circuit 10.

First MOSFET 32 functions as a switching element for opening and closing second charge line L2. Voltage monitor IC 33 acquires stored electricity voltage Vca of electricity storage circuit 10 from first charge line L1, to monitor stored electricity voltage Vca, and turns first MOSFET 32 on and off based on a result of the monitoring. Second resistor 34 is provided between second charge line L2 and a gate of first MOSFET 32. And third resistor 35 is provided between the gate of first MOSFET 32 and output port OP of voltage monitor IC 33. Here, by setting resistance values of second resistor 34 and third resistor 35 to an order of mega ohms, a current flowing in voltage monitor IC 33 through these resistors 34, 35 can be made small, and therefore, power consumption of main power supply 2 can be suppressed.

Cut-off circuit 40 is a circuit which causes main charge circuit 20 to be in a non-operating state when ignition switch 5 is in the OFF state, and meanwhile, prevents dark current from flowing from electricity storage circuit 10 to main charge circuit 20 in the non-operating state, that is, charge control circuit 22. Cut-off circuit 40 includes: second MOSFET 41 provided in voltage input line L4; transistor 42, fourth resistor 43, and fifth resistor 44, for causing second MOSFET 41 to perform switching operation; and sixth resistor 45 for causing transistor 42 to perform switching operation.

Second MOSFET 41 functions as a switching element for opening and closing voltage input line L4. Fourth resistor 43 is provided between voltage input line L4 and a gate of second MOSFET 41, and fifth resistor 44 is provided between the gate of second MOSFET 41 and a collector of transistor 42. Sixth resistor 45 is provided between a base of transistor 42 and third input terminal 1c.

Next, operation of vehicle electricity storage device 1 of the exemplary embodiment is described.

When a user of an automobile is going to start an engine, the ignition key is turned to the electricity supply position so that ignition switch 5 is turned on. After ignition switch 5 is turned on, transistor 42 is turned on and second MOSFET 41 is turned on in cut-off circuit 40. By this, voltage input line L4 turns into a closed state, and accordingly, charge control circuit 22 can now acquire stored electricity voltage Vca from first charge line L1, allowing main charge circuit 20 to start operating. If electricity storage circuit 10 has not reached to a full charge voltage, charge element 21 is turned on by charge control circuit 22, and charging to electricity storage circuit 10 by main charge circuit 20 is performed until the voltage reaches the full charge voltage.

Thereafter, the user turns the ignition key to the engine start position, which activates the starter to start the engine. At this time, since a large current flows through the starter, an output voltage of main power supply 2 may reduce. When such voltage reduction occurs, electricity is supplied (discharged) from electricity storage circuit 10 of vehicle electricity storage device 1 to load 3 through output terminal 1d. By this, voltage reduction of load 3 due to the voltage reduction of main power supply 2 can be suppressed, and accordingly, the electronic braking system being load 3 can maintain normal operation.

When stored electricity voltage Vca of electricity storage circuit 10 reduces after electricity is supplied to load 3, charging by main charge circuit 20 to electricity storage circuit 10 is performed again until the voltage reaches the full charge voltage.

In addition, some automobiles have a configuration that performs idling stop operation during a stop state of the automobile. In such automobiles, a starter automatically operates by releasing a brake, for example. In such a case, the voltage reduction can also occur in main power supply 2 similarly to the time of initial engine start. Therefore, supplying of electricity from electricity storage circuit 10 to load 3 and charging by main charge circuit 20 to electricity storage circuit 10 can be performed.

When the user finishes driving the automobile, stops the engine, and returns the ignition key to the lock position, ignition switch 5 is turned off. In cut-off circuit 40, after ignition switch 5 is turned off, transistor 42 is turned off and second MOSFET 41 is turned off. By this, voltage input line L4 turns into an open state, and accordingly, charge control circuit 22 cannot acquire stored electricity voltage Vca from first charge line L1 anymore. This causes main charge circuit 20 to stop operating. In a state of main charge circuit 20 stopping operation, since voltage input line L4 is in the open state, dark current is prevented from flowing from electricity storage circuit 10 to main charge circuit 20 through first charge line L1 and voltage input line L4. Accordingly, a current is not wastefully consumed from electricity storage circuit 10. Furthermore, since charge element 21 is in the OFF state, generation of dark current flowing from main power supply 2 to main charge circuit 20 can be prevented, thereby power consumed by main power supply 2 is suppressed.

In a state of main charge circuit 20 stopping operation, precharge circuit 30 is operating. In precharge circuit 30, a reference voltage, which is to be compared with stored electricity voltage Vca of electricity storage circuit 10, is set for voltage monitor IC 33. The reference voltage can be set as the same value as, for example, the full charge voltage.

As described above, although dark current to main charge circuit 20 is not generated, stored electricity voltage Vca of electricity storage circuit 10 may gradually reduce due to self-discharge of capacitor 11. At a stage that the voltage reduction of electricity storage circuit 10 due to self-discharge is not progressing so much, stored electricity voltage Vca maintains the full charge voltage which is equal to or higher than the reference voltage. Therefore, output port OP of voltage monitor IC 33 becomes a Hi level and first MOSFET 32 turns into the OFF state. Since second charge line L2 turns into the ON state, current does not flow to electricity storage circuit 10.

On the other hand, at a stage that the voltage reduction of electricity storage circuit 10 due to self-discharge progresses, and stored electricity voltage Vca falls below the full charge voltage and falls below the reference voltage, output port OP becomes a Lo level and first MOSFET 32 turns into the ON state. Thus, second charge line L2 turns into the closed state, and accordingly, current flows to electricity storage circuit 10 and electricity storage circuit 10 is charged. When stored electricity voltage Vca of electricity storage circuit 10 returns to the full charge voltage, voltage monitor IC 33 detects that the voltage has reached the reference voltage or higher, then output port OP becomes a Hi level and first MOSFET 32 turns into the OFF state. Thus, second charge line L2 turns into the open state and accordingly, current stops flowing to electricity storage circuit 10.

In this way, since precharge circuit 30 operates even while main charge circuit 20 is not operating, electricity storage circuit 10 is maintained in a state having a voltage close to the full charge voltage.

Here, precharge circuit 30 continues operating at all times regardless of the ON and OFF states of ignition switch 5. In other words, even when ignition switch 5 is in the ON state and main charge circuit 20 is operating, stored electricity voltage Vca of electricity storage circuit 10 is monitored by voltage monitor IC 33 and first MOSFET 32 is turned on and off according to a result of the monitoring. However, as described above, current flowing to electricity storage circuit 10 from precharge circuit 30 is significantly smaller than current flowing to electricity storage circuit 10 from main charge circuit 20. Therefore, charging from precharge circuit 30 hardly contributes to charging of electricity storage circuit 10.

Further, stored electricity voltage Vca is monitored while precharge circuit 30 is operating, therefore, a current flows in voltage monitor IC 33 through first charge line L1. However, since this current is only about several micro amp and smaller than the self discharge current of electricity storage circuit 10, power consumption in electricity storage circuit 10 is suppressed as much as possible.

Effects of Exemplary Embodiment

As stated above, the present exemplary embodiment exerts the following effects.

Since precharge circuit 30 operates even while main charge circuit 20 is not operating, electricity storage circuit 10 is maintained in a state having a voltage close to the full charge voltage. Therefore, even when the starter is activated immediately after ignition switch 5 is turned on, the starter is not likely to operate while electricity storage circuit 10 is not sufficiently charged. Accordingly, vehicle electricity storage device 1 can properly maintain backup of main power supply 2.

Moreover, a current flowing to electricity storage circuit 10 by operation of precharge circuit 30 is set to be smaller than a current flowing to electricity storage circuit 10 by operation of main charge circuit 20. Therefore, power consumption of main power supply 2 during ignition switch 5 being turned off is suppressed as much as possible.

Furthermore, since cut-off circuit 40 prevents generation of dark current flowing from electricity storage circuit 10 to main charge circuit 20, power consumption of electricity storage circuit 10 can be suppressed, in a state that operation of main charge circuit 20 is stopped.

Although the exemplary embodiment of the present invention has been described above, the present invention is not limited to the exemplary embodiment described above, and moreover, various modifications can be applied to application examples according to the present invention besides the exemplary embodiment described above.

Variation Example 1

Figure 2:
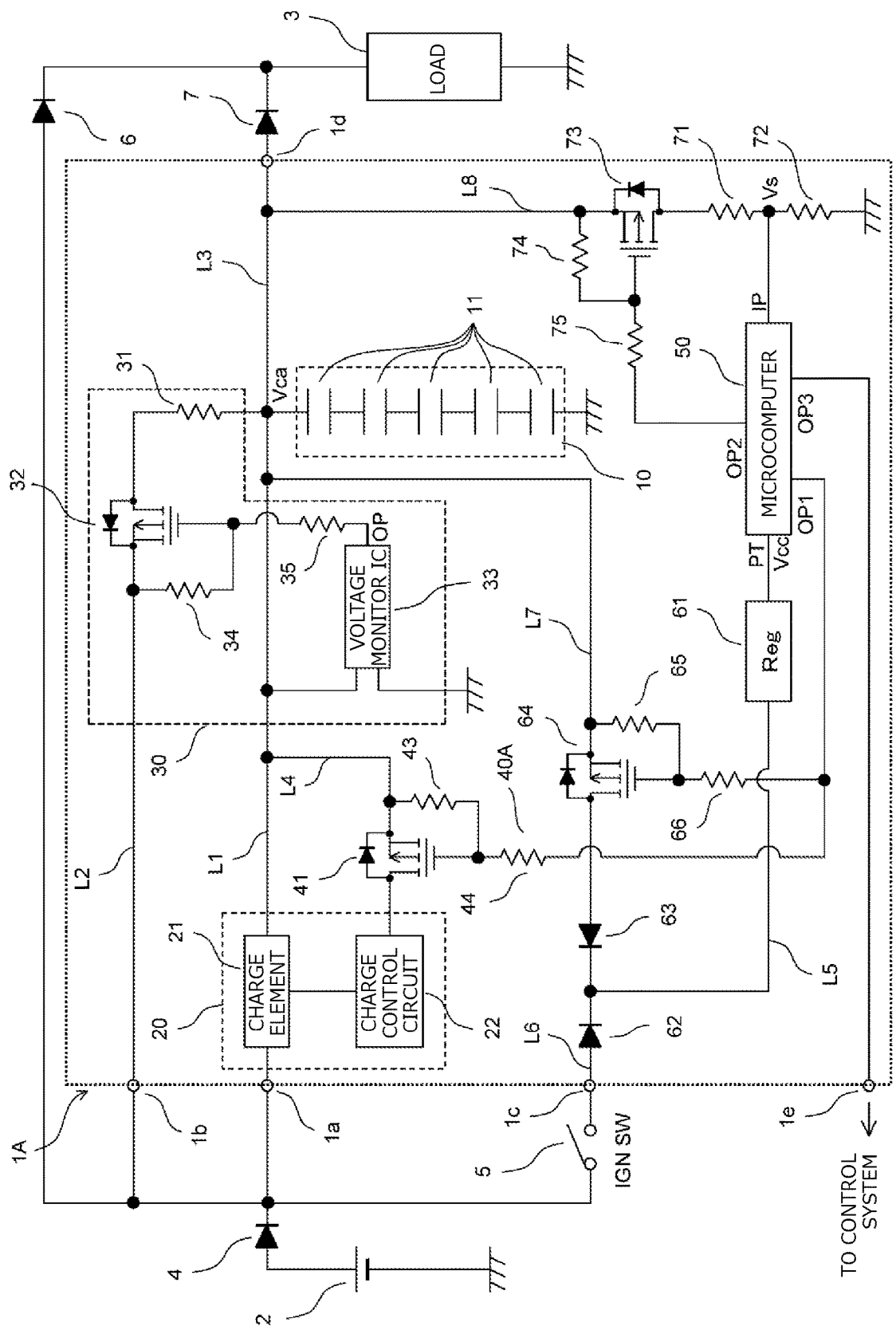
FIG. 2 is a circuit block diagram illustrating a configuration of the vehicle electricity storage device according to variation example 1.

FIG. 2 is a circuit block diagram illustrating a configuration of vehicle electricity storage device 1A according to variation example 1.

Vehicle electricity storage device 1A of the present variation example includes electricity storage circuit 10, main charge circuit 20, and precharge circuit 30, similarly to the above exemplary embodiment. Moreover, vehicle electricity storage device 1A includes microcomputer 50.

Power supply line L5 is connected to power supply terminal PT of microcomputer 50, and is branched into first power supply line L6 and second power supply line L7. First power supply line L6 is connected to third input terminal 1c and second power supply line L7 is connected to first charge line L1. Power supply line L5 is provided with power supply regulator 61. Power supply regulator 61 steps down an output voltage of main power supply 2 which is supplied from first power supply line L6, or stored electricity voltage Vca of electricity storage circuit 10 which is supplied from second power supply line L7. And power supply regulator 61 generates power supply voltage Vcc (for example, 5V) for microcomputer 50. Also, first power supply line L6 is provided with fourth diode 62 that prevents current backflow toward ignition switch 5. Further, second power supply line L7 is provided with fifth diode 63 and third MOSFET 64. Fifth diode 63 prevents current backflow toward first charge line L1, and third MOSFET 64 opens and closes second power supply line L7. In order to allow third MOSFET 64 to perform switching operation, seventh resistor 65 is provided between second power supply line L7 and a gate of third MOSFET 64, and also, eighth resistor 66 is provided between the gate of third MOSFET 64 and first output port OP1 of microcomputer 50.

Regarding voltage input line L4, second MOSFET 41, fourth resistor 43, and fifth resistor 44, which constitute cut-off circuit 40 in the above exemplary embodiment, are provided. And fifth resistor 44 is connected to first output port OP1 of microcomputer 50. Cut-off circuit 40 of the above exemplary embodiment is substituted by cut-off circuit 40A including second MOSFET 41, fourth resistor 43, fifth resistor 44, and microcomputer 50.

Input port IP of microcomputer 50 is inputted with monitor voltage Vs, which is generated by stepping down stored electricity voltage Vca using ninth resistor 71 and tenth resistor 72, from voltage monitor line L8 formed by serially connecting ninth resistor 71 and tenth resistor 72. Monitor voltage Vs is a voltage having a magnitude that can be inputted into microcomputer 50. And microcomputer 50 calculates stored electricity voltage Vca from monitor voltage Vs thus inputted.

Voltage monitor line L8 is provided with fourth MOSFET 73 that opens and closes voltage monitor line L8. In order to allow fourth MOSFET 73 to perform switching operation, eleventh resistor 74 is provided between voltage monitor line L8 and a gate of fourth MOSFET 73, and also, twelfth resistor 75 is provided between the gate of fourth MOSFET 73 and second output port OP2 of microcomputer 50.

Vehicle electricity storage device 1A is provided with error signal output terminal 1e. Third output port OP3 of microcomputer 50 is connected to error signal output terminal 1e.

Figure 3:
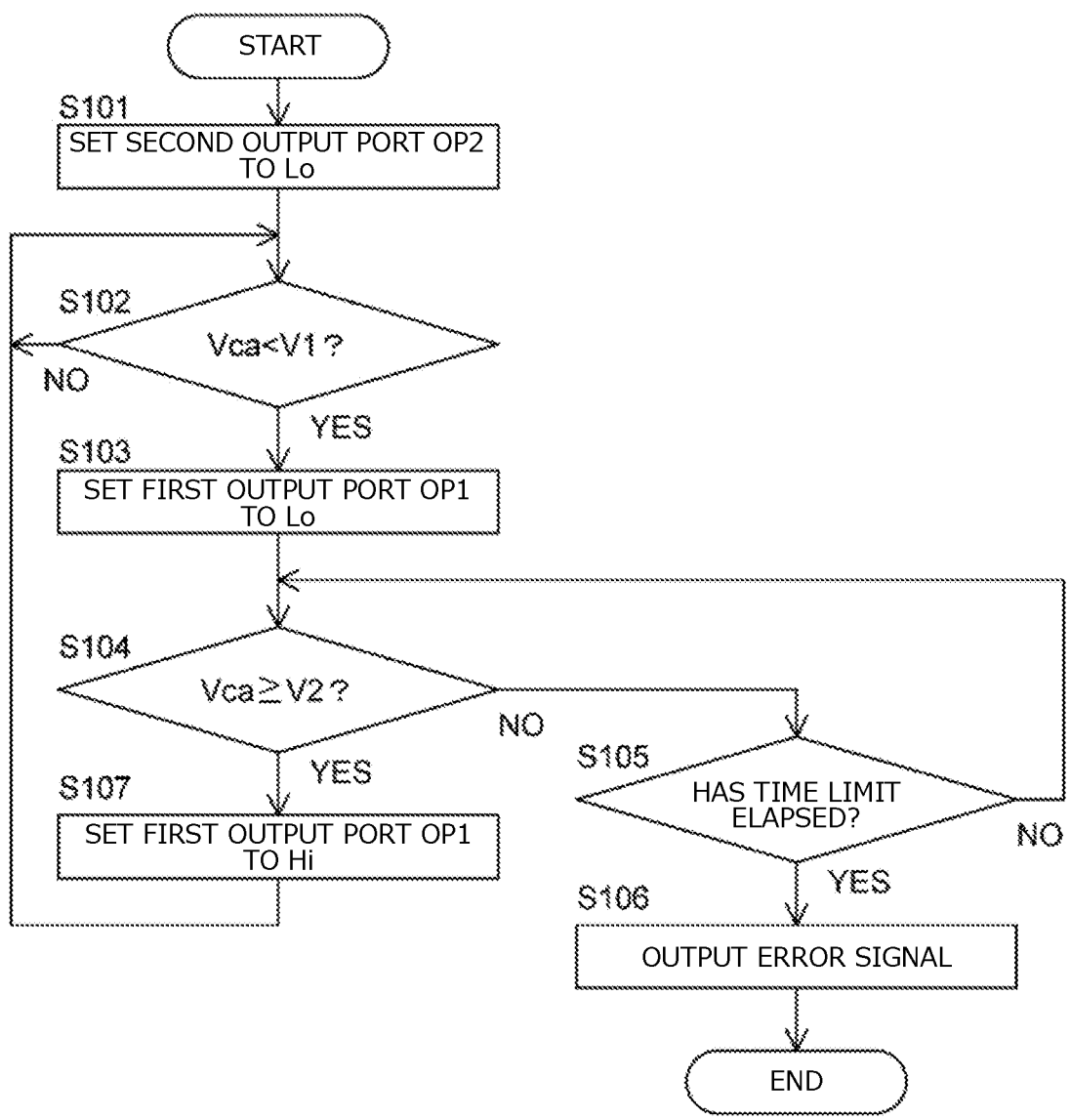
FIG. 3 is a flowchart illustrating a control process by a microcomputer according to variation example 1.

FIG. 3 is a flowchart illustrating a control process by microcomputer 50 according to variation example 1.

Hereinafter, operations of vehicle electricity storage device 1A of the present variation example are described with reference to FIG. 2 and FIG. 3.

When ignition switch 5 is turned on, power supply voltage Vcc is generated from output voltage of main power supply 2 by power supply regulator 61. And then power supply voltage Vcc higher than a reset voltage is applied to power supply terminal PT of microcomputer 50. This activates microcomputer 50, and initiates control processing by microcomputer 50.

First, microcomputer 50 sets second output port OP2 which has been at a Hi level to a Lo level (S101). This turns fourth MOSFET 73 on, and causes voltage monitor line L8 to be in the closed state and monitor voltage Vs to be inputted into input port IP of microcomputer 50. Microcomputer 50 determines whether or not stored electricity voltage Vca obtained from monitor voltage Vs is smaller than first predetermined voltage V1 (S102). First predetermined voltage V1 can be set as the same value as, for example, the full charge voltage.

When ignition switch 5 is in the OFF state, precharge circuit 30 is performing supplementary charging of electricity storage circuit 10. Accordingly, in an initial stage when ignition switch 5 is turned on, normally, stored electricity voltage Vca is in a fully charged state, and stored electricity voltage Vca is equal to or greater than first predetermined voltage V1. Thereafter, when the starter is activated to start the engine, electricity is supplied from electricity storage circuit 10 to load 3, which causes stored electricity voltage Vca to reduce.

As stored electricity voltage Vca reduces to cause stored electricity voltage Vca to fall below first predetermined voltage V1 (S102: YES), microcomputer 50 sets first output port OP1 which has been at a Hi level to a Lo level (S103). This turns second MOSFET 41 on, and causes voltage input line L4 to be in the closed state. Accordingly, charge control circuit 22 can now acquire stored electricity voltage Vca from first charge line L1, causing main charge circuit 20 to start operating. Charge control circuit 22 turns charge element 21 on, and main charge circuit 20 performs charging of electricity storage circuit 10.

Moreover, when first output port OP1 becomes the Lo level, third MOSFET 64 is turned on to cause second power supply line L7 to be in the closed state. Even when ignition switch 5 is turned off in this state, stored electricity voltage Vca is supplied from electricity storage circuit 10 to power supply regulator 61, accordingly, power supply voltage Vcc higher than a reset voltage is maintained at power supply terminal PT of microcomputer 50.

When switching first output port OP1 to the Lo level, microcomputer 50 initiates counting of a time limit and determines whether stored electricity voltage Vca is equal to or more than second predetermined voltage V2 (S104), and also, determines whether or not the time limit has passed (S105).

Second predetermined voltage V2 may be set to a value slightly lower than the full charge voltage, or to the same value as the full charge voltage. Further, the time limit may be set (for example, 5 seconds) to a time that is sufficient to allow stored electricity voltage Vca to reach second predetermined voltage V2 from a state of 0 V, if there is no abnormality in electricity storage circuit 10 or main charge circuit 20.

If there is an abnormality in electricity storage circuit 10, such as damage in capacitors 11, or an abnormality in main charge circuit 20, and stored electricity voltage Vca does not reach second predetermined voltage V2 within the time limit (S104: NO to S105: YES), microcomputer 50 outputs an error signal from third output port OP3 (S106). The error signal is transmitted to a control system of an automobile via error signal output terminal 1e.

On the other hand, if there is no abnormality in electricity storage circuit 10 or main charge circuit 20, and stored electricity voltage Vca reaches second predetermined voltage V2 within the time limit (S104: YES), microcomputer 50 turns first output port OP1 to the Hi level (S107). This turns second MOSFET 41 off, and causes voltage input line L4 to be in the open state. Then, charge control circuit 22 cannot acquire stored electricity voltage Vca from first charge line L1 anymore, causing main charge circuit 20 to stop operating. Since precharge circuit 30 is still operating, supplementary charging of electricity storage circuit 10 by precharge circuit 30 is resumed. Here, since voltage input line L4 becomes the open state, dark current flowing from electricity storage circuit 10 to main charge circuit 20 is not generated.

Moreover, when first output port OP1 becomes the Hi level, third MOSFET 64 is turned off to cause second power supply line L7 to be in the open state. This cuts off the supply of stored electricity voltage Vca from electricity storage circuit 10 to power supply regulator 61.

While ignition switch 5 is in the ON state, microcomputer 50 repeats processes of S102 to S105 and S107 as long as no abnormality is detected in electricity storage circuit 10 or main charge circuit 20. When ignition switch 5 turns off while the above processes are being repeated, the supply of output voltage from main power supply 2 to power supply regulator 61 is cut off.

When ignition switch 5 is turned off, if stored electricity voltage Vca has already reached second predetermined voltage V2 and first output port OP1 is in the Hi level, the supply of stored electricity voltage Vca from electricity storage circuit 10 to power supply regulator 61 is being cut off. Accordingly, voltage supply to microcomputer 50 is no longer available. This causes power supply voltage Vcc to become lower than the reset voltage, and microcomputer 50 thus stops.

When microcomputer 50 stops, first output port OP1 is kept maintained at the Hi level. Also, second output port OP2 turns from the Lo level to the Hi level and fourth MOSFET 73 is turned off to cause voltage monitor line L8 to be in the open state. This prevents generation of dark current flowing from electricity storage circuit 10 to ninth resistor 71 and tenth resistor 72.

On the other hand, in a case that the engine is stopped immediately after the activation of the starter to cause ignition switch 5 to be turned off, ignition switch 5 may be turned off before stored electricity voltage Vca reaches second predetermined voltage V2.

In such a case, since first output port OP1 is still at the Lo level, supply of stored electricity voltage Vca from electricity storage circuit 10 to power supply regulator 61 continues. Accordingly, power supply voltage Vcc higher than the reset voltage is maintained, allowing microcomputer 50 to keep operating. This allows main charge circuit 20 to keep operating, and the charging of electricity storage circuit 10 by main charge circuit 20 continues.

Thereafter, when stored electricity voltage Vca reaches second predetermined voltage V2, first output port OP1 is turned into the Hi level by microcomputer 50, and accordingly, third MOSFET 64 is turned off and the supply of stored electricity voltage Vca from electricity storage circuit 10 to power supply regulator 61 is cut off. This causes power supply voltage Vcc to become lower than the reset voltage and stops microcomputer 50.

As described above, according to the configuration of the present variation example, main charge circuit 20 continues operating when ignition switch 5 is turned off in a state that stored electricity voltage Vca of electricity storage circuit 10 is lower than second predetermined voltage V2. Accordingly, charging of electricity storage circuit 10 is prevented from being switched to charging only by precharge circuit 30 before electricity storage circuit 10 is sufficiently charged. Further, since main charge circuit 20 is made to stop operating after stored electricity voltage Vca has reached second predetermined voltage V2, proper transition to the supplementary charging by precharge circuit 30 can be performed.

Still further, according to the configuration of the present variation example, an abnormality of charging to electricity storage circuit 10 due to an abnormality in electricity storage circuit 10 or main charge circuit 20 is detected based on a charging condition when electricity storage circuit 10 is charged by operation of main charge circuit 20, that is, on a condition of how stored electricity voltage Vca rises. Accordingly, occurrence of the abnormality of charging to electricity storage circuit 10 can be notified to the control system or the like of the automobile.

Note that in the present variation example, microcomputer 50 corresponds to an "abnormality detection unit" described in the appended claims.

Other Variation Examples

In the above exemplary embodiment, precharge circuit 30 continues operating even when ignition switch 5 is in the ON state and main charge circuit 20 is in operation. However, as described above, it is not easy for precharge circuit 30 to contribute to the charging of electricity storage circuit 10 when main charge circuit 20 is in operation. Accordingly, a configuration may be adopted in which, when main charge circuit 20 is in operation, voltage monitor IC 33 is stopped or the like to cause precharge circuit 30 to stop operating.

Furthermore, in the above exemplary embodiment, the configuration is made in which, when ignition switch 5 is turned off, operation of main charge circuit 20 is immediately stopped. However, a configuration may be adopted in which a delay circuit is provided or the like between third input terminal 1c and cut-off circuit 40 so that after ignition switch 5 is turned off, main charge circuit 20 is kept to be in operation for a while (a predetermined delay time).

In addition, the exemplary embodiment of the present invention can be modified in various ways as appropriate within the scope of the technical idea disclosed in the appended claims.

The present invention is useful in a vehicle electricity storage device used in a vehicle such as an automobile.

The invention claimed is:

1. A vehicle electricity storage device connected to a load mounted on a vehicle together with a main power supply, the vehicle electricity storage device comprising:
an electricity storage unit connected to the load for supplying stored electricity to the load; and
a first charge unit and a second charge unit that are connected in parallel between the main power supply and the electricity storage unit, each of the first charge unit and the second charge unit being configured to charge the electricity storage unit, wherein:
a current flowing to the electricity storage unit via the second charge unit is smaller than a current flowing to the electricity storage unit via the first charge unit,
the first charge unit operates to charge electricity of the main power supply to the electricity storage unit when an ignition switch is in an ON state, and
the second charge unit operates to charge the electricity of the main power supply to the electricity storage unit when the ignition switch is in an OFF state.

2. The vehicle electricity storage device according to claim 1 further comprising a block unit that prevents generation of dark current flowing to the first charge unit from the electricity storage unit.

3. The vehicle electricity storage device according to claim 1, wherein the first charge unit continues operating when the ignition switch is turned off in a state that a stored electricity voltage of the electricity storage unit is lower than a predetermined voltage.

4. The vehicle electricity storage device according to claim 3, wherein the first charge unit stops operating when the stored electricity voltage of the electricity storage unit reaches the predetermined voltage by continuing operation of the first charge unit in a state of the ignition switch being turned off.

5. The vehicle electricity storage device according to claim 1 further comprising an abnormality detection unit that detects abnormality in charging to the electricity storage unit based on a charging condition at a time of the electricity storage unit being charged by operating of the first charge unit.

6. The vehicle electricity storage device according to claim 1, wherein the first charge unit continues operating to charge electricity of the main power supply to the electricity storage unit until a stored electricity voltage of the electricity storage unit reaches a full charge voltage.

7. A vehicle electricity storage device connected to a load mounted on a vehicle together with a main power supply, the vehicle electricity storage device comprising:
an electricity storage unit connected to the load for supplying stored electricity to the load; and
a first charge unit and a second charge unit that are connected in parallel between the main power supply and the electricity storage unit, each of the first charge unit and the second charge unit being configured to charge the electricity storage unit, wherein:
a current flowing to the electricity storage unit via the second charge unit is smaller than a current flowing to the electricity storage unit via the first charge unit,
the first charge unit includes a charge element and a charge control circuit,
the first charge unit operates to charge electricity of the main power supply to the electricity storage unit in a state that a first switch for being enable to execute a control procedure of the charge control circuit is turned on, the control procedure of the charge control circuit controlling to turn the charge element on and off according to a stored electricity voltage of the electricity storage circuit, and
the second charge unit operates to charge the electricity of the main power supply to the electricity storage unit in a state that the first switch is turned off.

8. The vehicle electricity storage device according to claim 7 further comprising a block unit that prevents generation of dark current flowing to the first charge unit from the electricity storage unit.

9. The vehicle electricity storage device according to claim 7, wherein the first charge unit continues operating when the first switch is turned off in a state that the stored electricity voltage of the electricity storage unit is lower than a predetermined voltage.

10. The vehicle electricity storage device according to claim 9, wherein the first charge unit stops operating when the stored electricity voltage of the electricity storage unit reaches the predetermined voltage by continuing operation of the first charge unit in a state of the first switch being turned off.

11. The vehicle electricity storage device according to claim 7 further comprising an abnormality detection unit that detects abnormality in charging to the electricity storage unit based on a charging condition at a time of the electricity storage unit being charged by operating of the first charge unit.

12. The vehicle electricity storage device according to claim 7, wherein the first charge unit continues operating to charge electricity of the main power supply to the electricity storage unit until the stored electricity voltage of the electricity storage unit reaches a full charge voltage.

* * * * *